United States Patent [19]
Schroeder

[11] 3,891,965
[45] June 24, 1975

[54] TIME DIVISION MULTIPLEX SYSTEM FOR A MOTOR VEHICLE

[75] Inventor: Thaddeus Schroeder, Sterling Heights, Mich.

[73] Assignee: General Motors Corporation, Detroit, Mich.

[22] Filed: Sept. 16, 1974

[21] Appl. No.: 506,224

[52] U.S. Cl............ 340/52 F; 340/184; 340/201 R
[51] Int. Cl............................................ G08c 15/12
[58] Field of Search.......... 340/52 F, 179, 180, 181, 340/182, 183, 184, 201 R, 413; 307/10 R

[56] References Cited
UNITED STATES PATENTS
3,281,808  10/1966  Church et al. ...................... 340/183
3,651,454  3/1972  Venema............................... 340/52

Primary Examiner—Alvin H. Waring
Attorney, Agent, or Firm—Albert F. Duke

[57] ABSTRACT

A time division multiplex system for a motor vehicle which includes a single cable arranged around the vehicle and comprising a power conductor, an information conductor, and a plurality of address lines. Various sender-receiver sets are addressed in appropriate time slots by an address generator so that information is transferred from respective information sources to corresponding load devices. Complementary codes are assigned to each sender-receiver set so that in the event of shorting or open circuiting of an address line the system will remain operational. Monitoring circuitry is provided for informing the operator of such an event. In a second embodiment a pair of power conductors and a pair of information conductors are provided for improving the reliability of the system.

4 Claims, 5 Drawing Figures

TIME DIVISION MULTIPLEX SYSTEM FOR A MOTOR VEHICLE

This invention relates to automotive multiplex systems and more particularly to a time division multiplex system for a motor vehicle incorporating diagnostic and failure preventing capabilities.

Various multiplex systems for motor vehicles have been proposed as a substitute for the present wiring harness. The employment of a multiplexing system is intended to permit the transmission of all commands and data throughout the car by a single cable consisting of only a few thin conductors connected to every switch, sensor, display, and electrical accessory. The potential benefits of the multiplexing approach are very attractive, especially in view of the expected additional wiring needed to implement expected control and display functions on future vehicles.

The prior art automotive multiplexing systems are primarily concerned with reducing the number of wires required to an absolute minimum. All systems, of course, require a power bus for conveying electrical power from the vehicle battery to the various load devices. Attempts have been made to also communicate information over the same line supplying power but these attempts have been largely unsuccessful and most recent attempts at vehicle mutiplexing systems incorporate a separate information wire over which data from an information source is transmitted. In order to function properly, time division multiplexing systems require a precise synchronization of the sender and receiver. The serial transmission of address bits as well as data signals over the same information line necessitates complicated timing electronics and has led to the proposal of a third wire for carrying timing signals. Nevertheless, the automotive multiplex system utilizing a single address line for the serial transmission of address bits requires a large number of shift registers at the input and output points of the multiplex systems besides the required coding and decoding circuitry.

Accordingly, it is an object of the present invention to provide an improved automotive multiplexing system which significantly reduces the amount of electronics required by the utilization of a parallel addressing of the various information channels in the system. It is another object of the present invention to provide an automotive multiplexing system of superior reliability in relation to the prior art system due to simpler electronics and redundant wiring which permits an undisturbed system operation in case some conductor is broken or shorted to ground.

In accordance with the present invention a time division multiplexing system for motor vehicles is provided which includes in its simplest form a single power bus and a single information line which interconnect a plurality of sender-receiver sets. Synchronization between the sender-receiver sets is accomplished by a binary addressing scheme utilizing parallel transmission through dedicated address lines. All information channels are continuously scanned in a predetermined recurrence sequence. The scanning rate is constant and high enough to satisfy the conditions of the sampling theorem. The sequencing is achieved by means of an address generator comprising a binary counter and a clock of a desired frequency. The address lines are protected against shorting of conductors by means of an expanded address coding. The assignment of two address codes, one being the logical complement of the other, safeguards against a failure in case a single address line becomes shorted to ground or to the power line. In such an event, only one of the two complementary address codes assigned to each channel is affected. The remaining code still permits an undisturbed operation of the multiplexing system. In addition, means are provided for detecting when an address line is shorted to ground or to the power line so as to warn the driver of the malfunction.

In another embodiment of the present invention, two completely separate power lines are used. Each line is connected to the power source through its own fuse. Senders are receivers are supplied from both lines simultaneously through pairs of diodes which prevent current flow between the lines. In addition, these diodes serve as fuses during a sender or receiver malfunction. If a power line becomes shorted to ground all diodes connected to it are reverse biased and the shorted line is removed from the power distribution system. Furthermore, in this embodiment two information lines are provided in addition to the two power lines. By using two information lines which are electrically decoupled one from the other by a pair of diodes, the multiplexing system continues to operate even if one information line becomes grounded.

A more complete understanding of the present invention may be had from the following detailed description which should be read in conjunction with the drawings in which.

Figure 1:
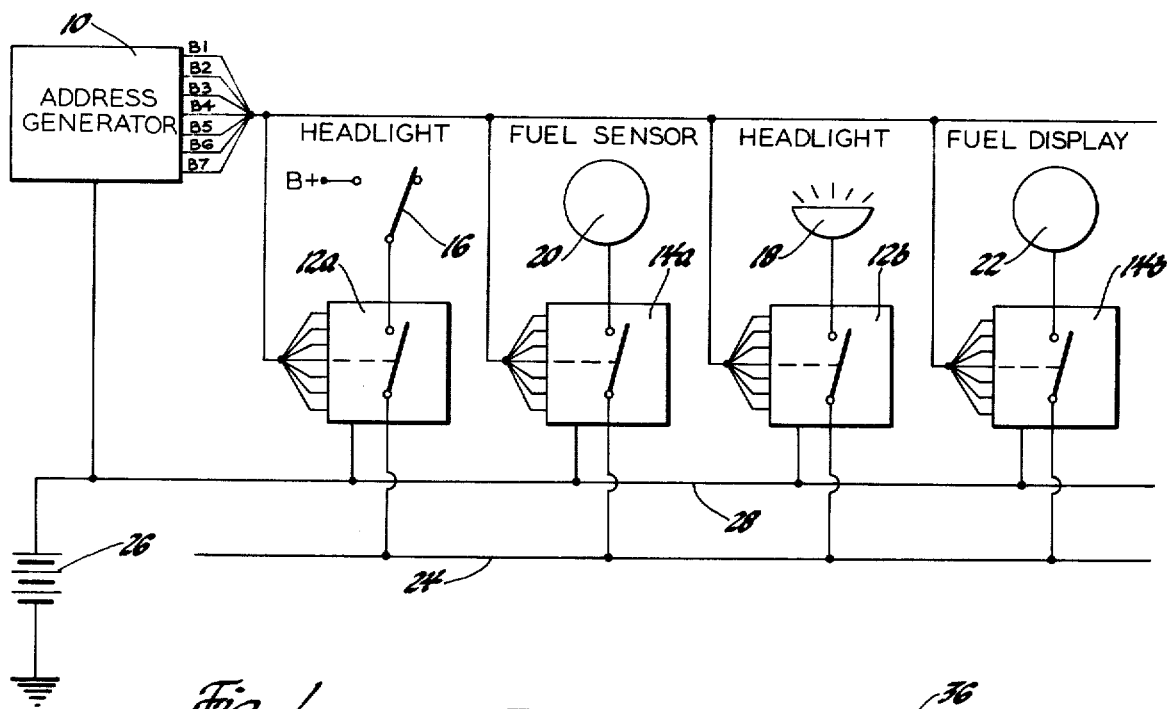
FIG. 1 is a block diagram of the multiplexer of the present invention.

Referring now to the drawings and initially to FIG. 1, the automotive multiplex system of the present invention includes a 7 bit address generator 10. The function of the address generator 10 is a repeated generation of a sequence of different binary numbers. Each information channel within the multiplex system is assigned complementary numbers which serve as an address for that channel. The address is supplied over seven address lines designated B1–B7 to appropriate sender-receiver sets. Seven address lines are sufficient to address over 50 different sender-receiver sets assigning complementary addresses to each set. For the purposes of explanation, only two of the various sender-receiver sets of the system are shown and are designated 12a, 12b and 14a, 14b respectively. For example, the sender-receiver set 12a, 12b when properly addressed, permits information regarding the position of the headlight switch 16 to be passed over an information conductor 24 to control energization of the vehicle headlights 18. The sender-receiver set 14a, 14b when properly addressed, similarly permits information regarding the status of the fuel tank as detected by a fuel sensor 20 to be transmitted over information conductor 24 to control a fuel display 22 which indicates the amount of fuel remaining. Power is supplied from the vehicle battery 26 over a power bus 28 to the address generator 10 and each of the sender-receiver sets. The input to the senders 12a and 14a from the power bus 28 provides a supply voltage for the sender logic while the input to the receivers 12b and 14b from the power bus 28 provides both the necessary logic supply voltage and power supply for the load devices 18 and 22. The addresses of the various sender-receiver sets are generated by the address generator 10 in sequence so that the sender-receiver set 12a and 12b is simultaneously addressed and are interconnected by the information line 24. If at the time the sender-receiver set 12a, 12b is addressed the headlight switch is in the On position, and this information will be transmitted from the sender 12a over the information conductor 24 to the receiver 12b. Switch means (not shown) responsive to the information on the conductor 24 connect the headlights 18 to the power bus 28. Similarly, during the time slot allotted for the fuel status information channel the sensor 20 and display 22 are interconnected through the sender-receiver set 14a, 14b and the information conductor 24 so that the analog data from the sensor 20 is supplied to the display 22 to indicate the fuel remaining.

Figure 2:
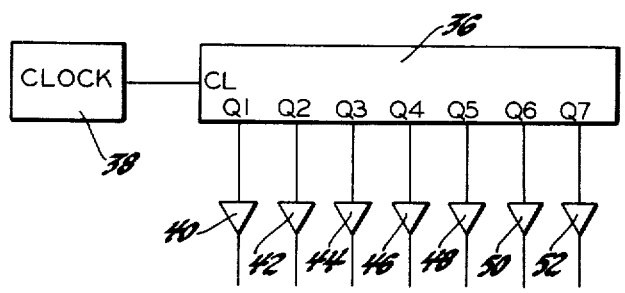
FIG. 2 is a more detailed block diagram of the address generator of the present invention.

Referring now to FIG. 2, the address generator 10 preferably includes a seven bit binary Gray Code counter generally designated 36 which is toggled from a clock source 38. The Q1–Q7 outputs of the counter 36 are applied through line drivers 40–52 respectively to the address line B1–B7. In the Gray Code a transition to the next number requires a change of only 1 bit and provides an extremely reliable addressing approach since it precludes the formation of transitional addresses during an address change.

Figure 3:
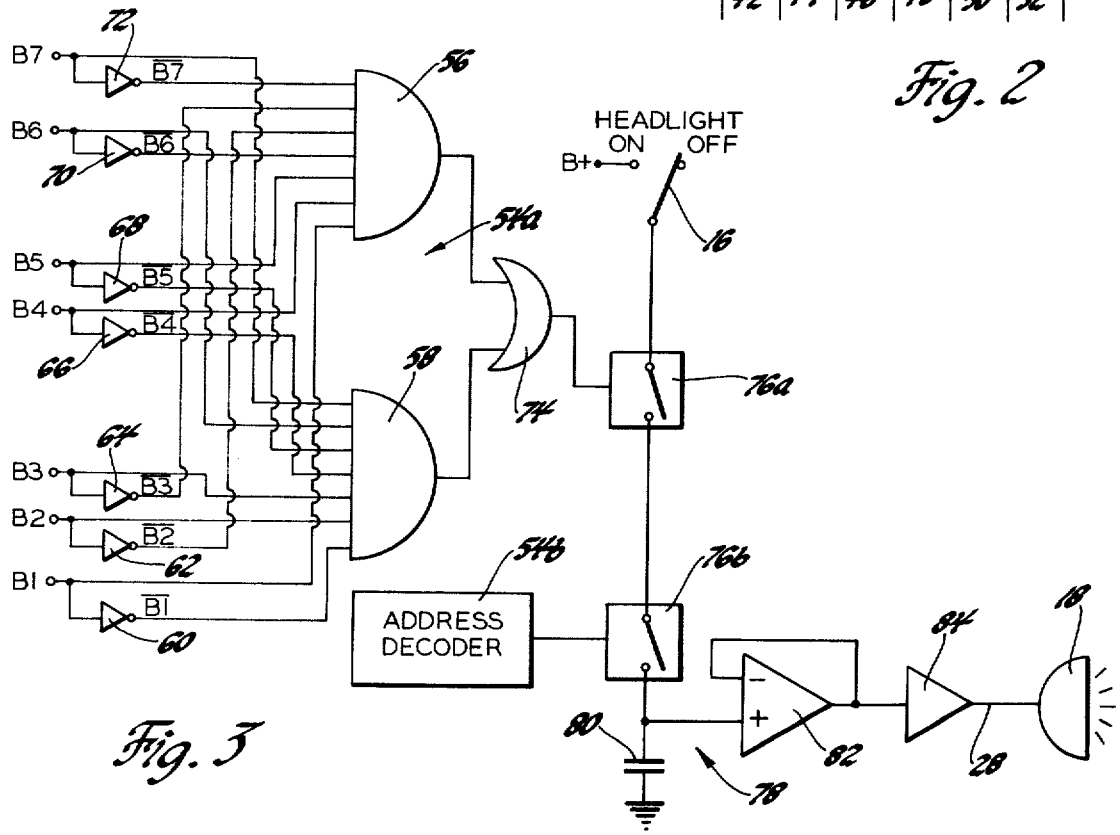
FIG. 3 is a more detailed schematic diagram of a typical sender-receiver set.

Referring now to FIG. 3, an exemplary information channel between an information source such as the headlight switch 16 and a load device such as the headlight 18 is shown in more detail. Sender 12a and receiver 12b each include address decoders generally designated 54a and 54b. Each address decoder comprising a pair of AND gates 56 and 58 which respond to complementary code numbers from the address generator 10. This is accomplished by inverting each bit on the address line B1–B7 by means of inverters 60–72 to produce the complement designated $\overline{B1}$–$\overline{B7}$. The inputs to the AND gates 56 and 58 are connected with appropriate ones of the address line B1–B7 or the $\overline{B1}$–$\overline{B7}$ outputs of the inverters 60–72 depending on the complementary codes assigned to the sender-receiver set. In the specific example shown the AND gate 56 responds to the binary code 0011001 while the AND gate 58 responds to the binary code word 1100110. The assignment of two address codes per information channel, one being the logical complement of the other, safeguards against a failure in case a single address line becomes shorted to ground or to the power line. In such an event, one of the two complementary address codes assigned to each channel will still be effective. The remaining codes will still permit an undisturbed operation of the multiplexing system. Shorting of more than one address line to ground or to the power line will only partially disable the system. Similarly, a short between two address lines will disable only half of all available channels. Moreover, a shorted address line, especially one shorted to ground or to the power line, can be easily detected as will be shown hereinafter in FIG. 5 so that the driver can be warned of the malfunction. The output of the AND gates 56 and 58 provide inputs to an OR gate 74 the output of which controls an analog gate 76a which passes information regarding the status of the headlight switch 16. The analog gate 76a may be any of several available analog sampling devices such as the CMOS bilaterial switch. The receiver 14b comprises the address decoder 54b and an analog gate 76b which are identical with the decoder 54a and the gate 76a respectively. The receiver further includes a conventional zero-order hold circuit generally designated 78 which comprises a capacitor 80 and an operational amplifier 82. The circuit 78 stores the data in its information channel during the time the remaining channels are being addressed. The size of the capacitor C is determined by the rate of sampling and the input impedance of the amplifier 82. The output of amplifier 82 is amplified by a power amplifier 84 connected with the power bus 28 to drive the headlights 18.

Figure 4:
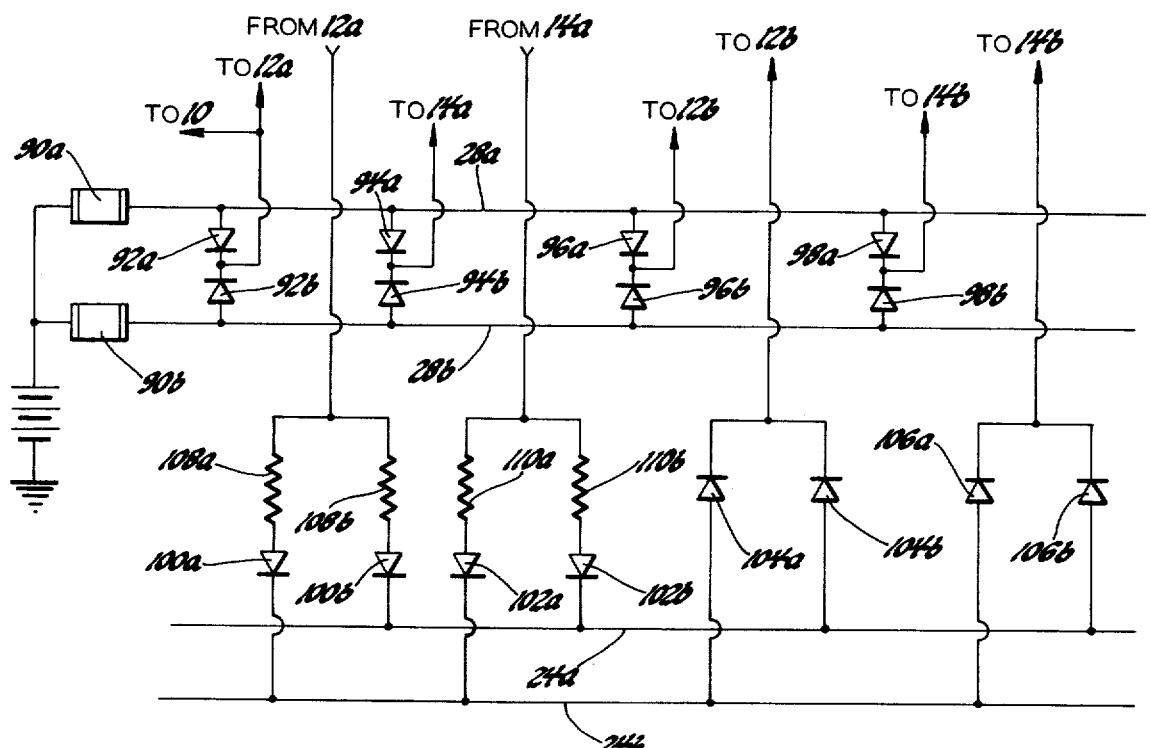
FIG. 4 is a partial schematic diagram of another embodiment of the invention utilizing dual power buses and dual information conductors.

Referring now to FIG. 4, another embodiment of the invention shown in FIG. 1 is disclosed. In this embodiment a pair of information buses 24a and 24b and a pair of power buses 28a and 28b are employed to improve the reliability of the system. Each of the power conductors 28a and 28b are connected with the battery 26 through respective fuses 90a and 90b. The address generator 10 as well as all senders and all receivers are supplied from both lines simultaneously through pairs of diodes 92a, 92b to 98a, 98b. The back-to-back arrangement of the diodes prevent current flow between the power conductors 28a and 28b. If one of the power conductors 28a or 28b becomes shorted to ground the associated fuse 90a or 90b blows and reverse biases all diodes connected to it. As a result the shorted line is removed from the power distribution system. The arrangement shown in FIG. 4 lends itself to easy diagnosis and requires only a simple repair when a power line becomes shorted since the shorted line will not cause diode destruction. While a pair of diodes is shown for connecting each of the senders and receivers to the power conductors 28a and 28b it should be understood that more than one sender or receiver may be located in the same area of the vehicle and connected with the power conductors 28a and 28b through a single pair of diodes.

The redundant information lines 24a and 24b reduce the vulnerability of the multiplexing system to an accidental grounding of the information line. The information signals are transmitted simultaneously through the two independent information conductors 24a and 24b. At each sender and receiver diodes 100a, 100b to 106a, 106b prevent electrical coupling between conductors 24a and 24b. The senders are provided with load resistors 108a, 108b and 110a and 110b for limiting the output current of the sensor in case of grounding of one of the information lines 24a and 24b. If one of the lines 24a, 24b becomes shorted to ground, the reverse bias diodes in the grounded line effectively disconnect the receivers from the grounded line, and the multiplexing system will continue to operate utilizing the remaining information line. The senders should, therefore, be rated for grounded line condition rather than normal operation.

Figure 5:
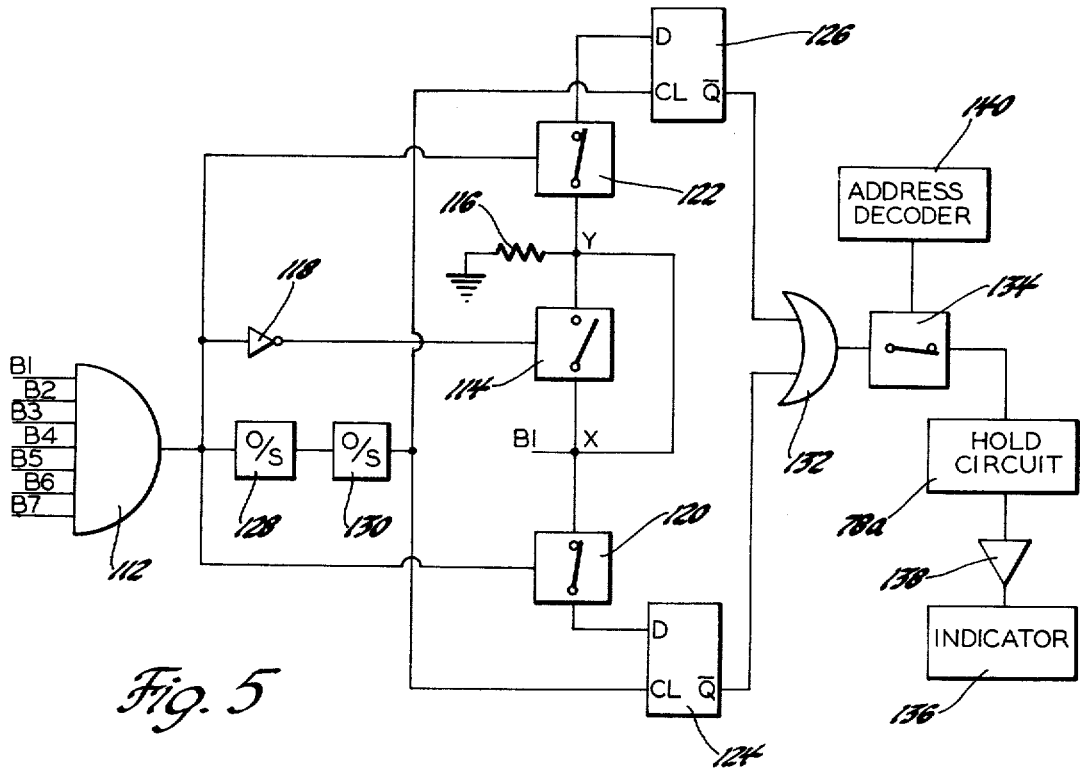
FIG. 5 is a schematic diagram of malfunction detection circuitry associated with the address lines of the present invention.

Referring now to FIG. 5, monitoring circuitry for the address line B1 is shown. Similar circuitry would be provided for each of the other address lines B2–B7 as well as each of the information lines 24a and 24b. The monitoring circuitry is a part of the address generator 10 and includes an AND gate 112 responsive to the data on the address lines B1–B7. The gate 112 responds to the address 111111 hereinafter referred to as the diagnostic address. The address line B1 is looped around the vehicle as are the power conductors 28 and the information conductor 24. An analog switch 114 is located between points x and y of the address line B1 within the address generator 10. The point y is connected to ground through a pull-down resistor 116. The switch 114 is controlled by the gate 112 through an inverter 118. The output of the gate 112 is low except upon the occurrence of the diagnostic address so that the control input to the switch 114 from the inverter 118 is normally high maintaining the switch 114 in a closed condition. Analog switches 120 and 122 are connected between the points x and y and the D input of flip-flops 124 and 126 respectively. When the output of the gate 112 is high the switch 114 opens and the switches 120 and 122 close. The flip-flops 124 and 126 are clocked from the gate 112 through delay means comprising one-shot multivibrators 128 and 130. The Q output of the flip-flops 124 and 126 are connected with the inputs of an OR gate 132. The gate 132 is connected with an analog switch 134 the output of which controls an indicator 136 through a hold circuit 78a and a power amplifier 138. The switch 134 is controlled from an address decoder 140 which is addressed during a different time slot than the addressing of the gate 112. During the time slot assigned to the diagnostic address the gate 114 opens and the gates 120 and 122 close. If the address line is in good condition the points x and y will be high and the output of the flip-flops 124 and 126 will be driven low. Accordingly, when the time slot assigned to the indicator 136 occurs the gate 140 closes the switch 134 but since both inputs to the OR gate 132 are low the indicator 136 is not energized. If the address line is shorted then the points x and y will both be low and both inputs to the OR gate 132 will be high and the indicator lamp 136 will be energized during its assigned time slot. If the address line is open circuited then the point x will be high and the point y will be low. The Q output of the flip-flop 124 will be driven low but the output of the flip-flop 126 will be driven high so that the indicator 136 will be energized during its assigned time slot.

Having thus described my invention what I claim is:

1. In a motor vehicle having a source of direct current, a plurality of information input means and associated load means, a time division multiplex system for controlling the application of current to said load means comprising:

a sender-receiver set for each input means and associated load means;

address generator means for successively generating a plurality of multibit binary words;

conductor cable means including a power conductor for supplying current from said source to said address generator means and each of said sender-receiver sets, said cable means including an information conductor interconnecting each sender-receiver set, said cable means further including a plurality of address conductors interconnecting said address generator means with said sender-receiver sets, the number of address conductors corresponding to the number of bits in each of said plurality of multibit binary words;

each of said sender-receiver sets including address decoder means responsive to different binary words whereby information may be communicated between respective sender-receiver sets during the time the respective sender-receiver sets are being addressed;

the receiver in each sender-receiver set controlling the application of current to the associated load means in response to the information received from the associated sender.

2. The invention defined in claim 1 wherein said system further includes circuitry for monitoring and indicating a fault condition with respect to any of said plurality of address conductors and including first, second, and third analog gate means connecting said first analog gate between an originating point and a terminating point of an address line, a pulldown resistor connected between said terminating point and a reference potential, first address decoder means for controlling said first, second, and third analog gates;

said first decoder means opening said first analog gate and closing said second and third analog gates in response to a predetermined one of said multibit binary words, first and second flip-flops connected with said second and third analog gate means respectively and adapted to be clocked from said first address decoder means for storing the logic level at said originating and terminating point, a fourth analog gate, second address decoder means responsive to a multibit binary word different from the word to which said first address decoder means responds for controlling said fourth analog gate, indicator means responsive to the output of said fourth analog gate, logic means responsive to the state of said first or second flip-flops and providing an input to said fourth analog gate whereby said indicator means is energized if said address line is shorted to ground or open circuited.

3. In a motor vehicle having a source of direct current, a plurality of information input means and associated load means, a time division multiplex system for controlling the application of current to said load means comprising:

a sender-receiver set for each input means and associated load means;

address generator means comprising an iterative Gray Code counter and clock means for driving said counter to successively generate a plurality of multibit binary words;

conductor cable means including a power conductor for supplying current from said source to said address generator means and each of said sender-receiver sets, said cable means including an information conductor interconnecting each sender-receiver sets, said cable means further including a plurality of address conductors interconnecting said address generator means with said sender-receiver sets, the number of address conductors corresponding to the number of bits in each of said plurality of multibit binary words;

each of said sender-receiver sets including address decoder means responsive to complementary ones of said binary words whereby information may be communicated between respective sender-receiver sets during the time the respective sender-receiver sets are being addressed;

the receiver in each sender-receiver set controlling the application of current to the associated load means in response to the information received from the associated sender.

4. In a motor vehicle having a source of direct current, a plurality of information input means and associated load means, a time division multiplex system for controlling the application of current to said load means comprising:

a sender-receiver set for each input means and associated load means;

address generator means for successively generating a plurality of multibit binary words, said generator means including an iterative Gray code counter and clock means for driving said counter to successively generate a plurality of multibit binary words;

conductor cable means including a pair of power conductors, separate fuse means connecting respective ones of said power conductors to said source, a plurality of pairs of back-to-back diodes interconnecting said power conductors, means interconnecting said address generator means and each of said sender-receiver sets to a junction between certain ones of said back-to-back diodes, said cable means further including an information conductor interconnecting said sender-receiver sets, said cable means further including a plurality of address conductors interconnecting said address generator means with each of saiad sender-receiver sets, the number of address conductors corresponding to the number of bits in each of said plurality of multibit binary words;

each of said sender-receiver sets including address decoder means responsive to complementary ones of said binary words whereby information may be communicated between respective sender-receiver sets twice during any address cycle;

the receiver in each of said sender-receiver sets controlling the application of current to the associated load means in accordance with the information received from the associated sender.

* * * * *

UNITED STATES PATENT AND TRADEMARK OFFICE
CERTIFICATE OF CORRECTION

PATENT NO. : 3,891,965
DATED : June 24, 1975
INVENTOR(S) : Thaddeus Schroeder

It is certified that error appears in the above-identified patent and that said Letters Patent are hereby corrected as shown below:

Column 2, line 13, "are" should read -- and --.

Column 5, line 22, "Q" should read -- $\bar{Q}$ --.

Column 5, line 43, "Q" should read -- $\bar{Q}$ --.

Column 8, line 8, "saiad" should read -- said --.

Signed and Sealed this fourteenth Day of October 1975

[SEAL]

Attest:

RUTH C. MASON
Attesting Officer

C. MARSHALL DANN
Commissioner of Patents and Trademarks